(12) United States Patent
Watanabe (10) Patent No.: US 10,877,705 B1
(45) Date of Patent: Dec. 29, 2020

(54) IMAGE FORMING APPARATUS WITH DIFFERENT OPERATION MODES AND IMAGE FORMING METHOD FOR IMAGING FORMING APPARATUS WITH DIFFERENT OPERATION MODES

(71) Applicant: TOSHIBA TEC KABUSHIKI KAISHA, Tokyo (JP)

(72) Inventor: Yasuhiko Watanabe, Chigasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/585,951

(22) Filed: Sep. 27, 2019

(51) Int. Cl.
*G06F 3/12* (2006.01)

(52) U.S. Cl.
CPC .......... *G06F 3/1221* (2013.01); *G06F 3/126* (2013.01); *G06F 3/1217* (2013.01); *G06F 3/1229* (2013.01); *G06F 3/1285* (2013.01)

(58) Field of Classification Search
None
See application file for complete search history.

(56) References Cited

U.S. PATENT DOCUMENTS

| 8,941,865 B2 | 1/2015 | Sakai | |
| 2011/0010570 A1* | 1/2011 | Hikichi | G06F 3/1229 713/320 |
| 2013/0050759 A1* | 2/2013 | Tsuchiya | G06F 3/1285 358/1.15 |
| 2018/0234570 A1* | 8/2018 | Yamaguchi | G06F 3/1221 |

* cited by examiner

*Primary Examiner* — Thomas D Lee
(74) *Attorney, Agent, or Firm* — Kim & Stewart LLP (57) ABSTRACT

According to one embodiment, an image forming apparatus having a plurality of operation modes including a normal mode and a power saving mode in which power consumption is less than that in the normal mode and includes a processor. The processor is configured to acquire information about unexecuted print jobs via a communication interface or the like. The processor transitions the apparatus to the power saving mode after a preset standby time elapses after a completion of a print job by the apparatus if an unexecuted print job satisfies predetermined conditions that indicate that the unexecuted print job can be executed on the apparatus. The processor transitions the apparatus to the power saving mode sooner than the elapse of the preset standby time after the completion of the print job if none of the unexecuted print jobs satisfies the predetermined conditions.

17 Claims, 9 Drawing Sheets

IMAGE FORMING APPARATUS WITH DIFFERENT OPERATION MODES AND IMAGE FORMING METHOD FOR IMAGING FORMING APPARATUS WITH DIFFERENT OPERATION MODES

FIELD

Embodiments described herein relate generally to an image forming apparatus and an image forming method.

BACKGROUND

An image forming apparatus transitions to a power saving mode when a preset period of time is elapsed after a user logs out. When the image forming apparatus is powered on but not being used, it is unnecessarily consuming power until it switches to the power saving mode. On the other hand, if the image forming apparatus transitions to the power saving mode immediately after use, then a long period of time will be required to wake up from the power saving mode for the next use or user, and thus the apparatus cannot execute printing as immediately as requested in some cases.

DETAILED DESCRIPTION

In general, according to one embodiment, an image forming apparatus has a plurality of operation modes including a normal mode and a power saving mode in which power consumption is less than that in the normal mode and includes a processor. The processor is configured to: acquire information of unexecuted print jobs via a communication interface; transition the apparatus to the power saving mode after a preset standby time elapses after a completion of a print job by the apparatus if an unexecuted print job in the unexecuted print jobs satisfies predetermined conditions that indicate that the unexecuted print job can be executed on the apparatus; and transition the apparatus to the power saving mode after a standby time shorter than the preset standby time is elapsed after the completion of the print job if none of the unexecuted print jobs satisfies the predetermined conditions.

First Embodiment

Figure 1:
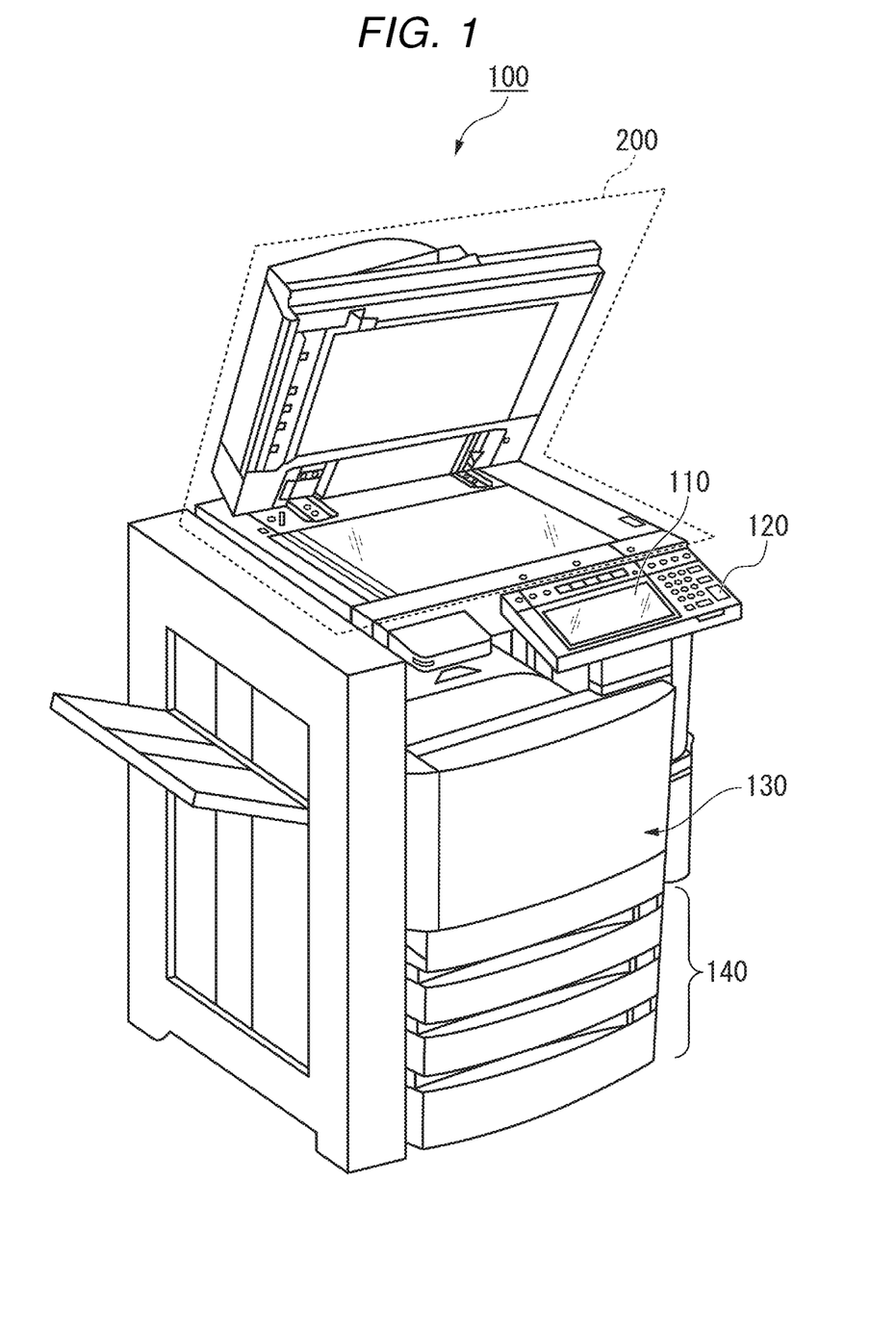
FIG. 1 depicts an image forming apparatus according to a first embodiment.

FIG. 1 depicts an overall configuration example of an image forming apparatus 100 according to a first embodiment. The image forming apparatus 100 is, for example, a multi-function peripheral. The image forming apparatus 100 includes a display 110, a control panel 120, a printer unit 130, a sheet accommodation unit 140, and an image reading unit 200. The printer unit 130 in the image forming apparatus 100 may be an electrographic device that fixes a toner image or an ink jet device.

The image forming apparatus 100 forms an image on a sheet using a developer such as a toner. The sheet is, for example, paper or label paper. The sheet may be any material as long as the image forming apparatus 100 can form an image on a surface thereof.

The display 110 is an image display device such as a liquid crystal display or an organic EL (Electro Luminescence) display. The display 110 displays various types of information related to the image forming apparatus 100.

The control panel 120 includes a plurality of buttons. The control panel 120 receives the input operation of a user. The control panel 120 outputs a signal corresponding to the input from the user to a control unit of the image forming apparatus 100. The display 110 and the control panel 120 may be configured to be integrated into a touch panel.

The printer unit 130 forms an image on the sheet based on image information generated by the image reading unit 200 or image information received through a communication path. The printer unit 130 forms an image through, for example, the following process. The printer unit 130 forms an electrostatic latent image on a photoconductive drum based on the image information. The printer unit 130 applies the developer to the electrostatic latent image to form a visible image thereon. A specific example of the developer is toner. The printer unit 130 transfers the visible image to the sheet. The printer unit 130 applies heat and pressure to the sheet to fix the visible image to the sheet. The sheet on which the image is formed may be a sheet accommodated in the sheet accommodation unit 140 or a sheet that is manually fed.

The sheet accommodation unit 140 accommodates the sheet used for forming the image in the printer unit 130.

The image reading unit 200 reads image information of a reading target in the form of brightness of light. The image reading unit 200 records the read image information. The recorded image information may be transmitted to another information processing apparatus through a network. The recorded image information may be formed as an image on the sheet by the printer unit 130.

Figure 2:
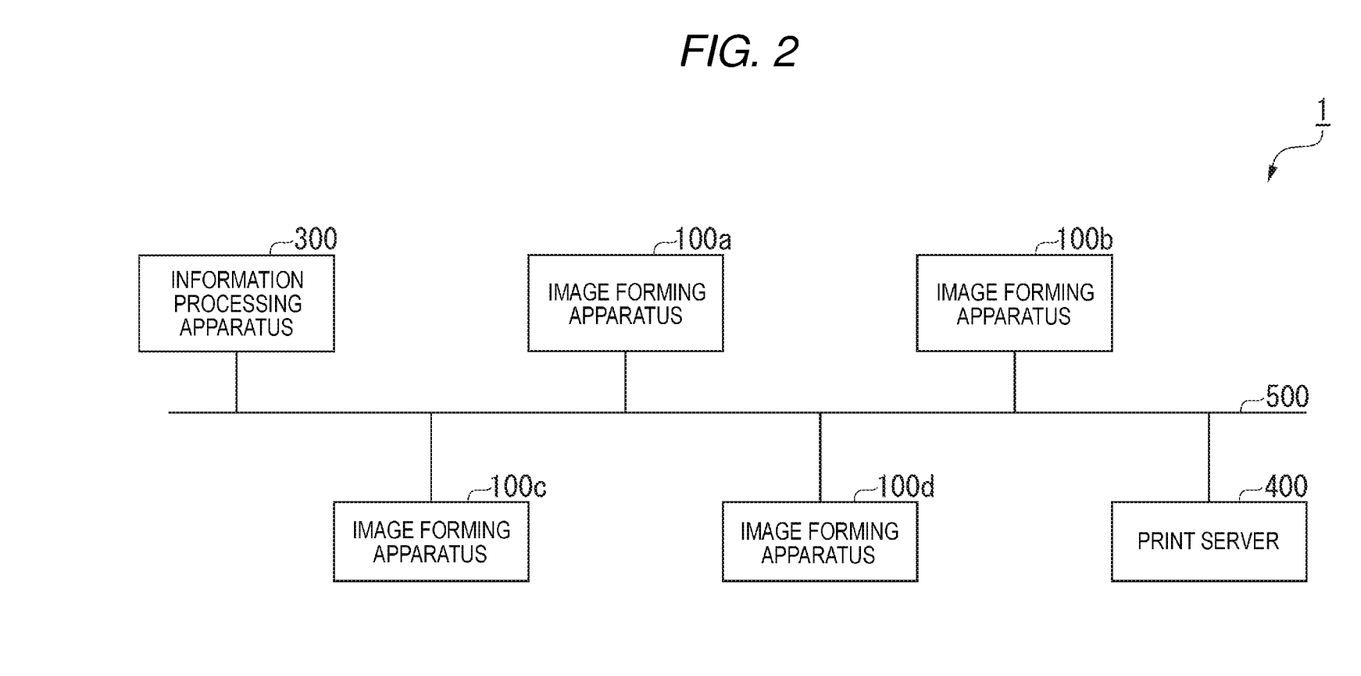
FIG. 2 depicts a system configuration of an image forming system.

FIG. 2 is a system configuration diagram illustrating a system configuration of an image forming system 1 according to the first embodiment. The image forming system 1 is provided in a network 500. The image forming system 1 includes an image forming apparatus 100a, an image forming apparatus 100b, an image forming apparatus 100c, an image forming apparatus 100d, an information processing apparatus 300, and a print server 400 that are communicatably connected to each other through the network 500. For example, the network 500 may be an intranet such as a local area network (LAN). Hereinafter, when it is not necessary to distinguish the image forming apparatuses (100a, 100b, 100c, 100d) from each other, the image forming apparatuses will be simply referred to as "image forming apparatus 100".

The information processing apparatus 300 transmits a print job to the print server 400. The information processing apparatus 300 is an information processing apparatus such as a personal computer, a smartphone, or a tablet computer. The print job includes information relating to an image for executing printing. The print job may include identification information representing a user who transmits the print job. The identification information is information that does not overlap identification information of another user. For example, the identification information may be any information as long as it is information such as a character string including numbers and alphabets. The print job may further include print setting information representing a setting for executing printing on a sheet. For example, the print setting information may be any information as long as it is information relating to a print setting such as monochrome printing, color printing, decolorable printing, duplex printing, collective printing, or stapling.

The print server 400 is an information processing apparatus such as a server or a personal computer. The print server 400 stores/records the received print job in a storage device. The print server 400 transmits the recorded print job to the image forming apparatus 100 in response to a request from the image forming apparatus 100.

Figure 3:
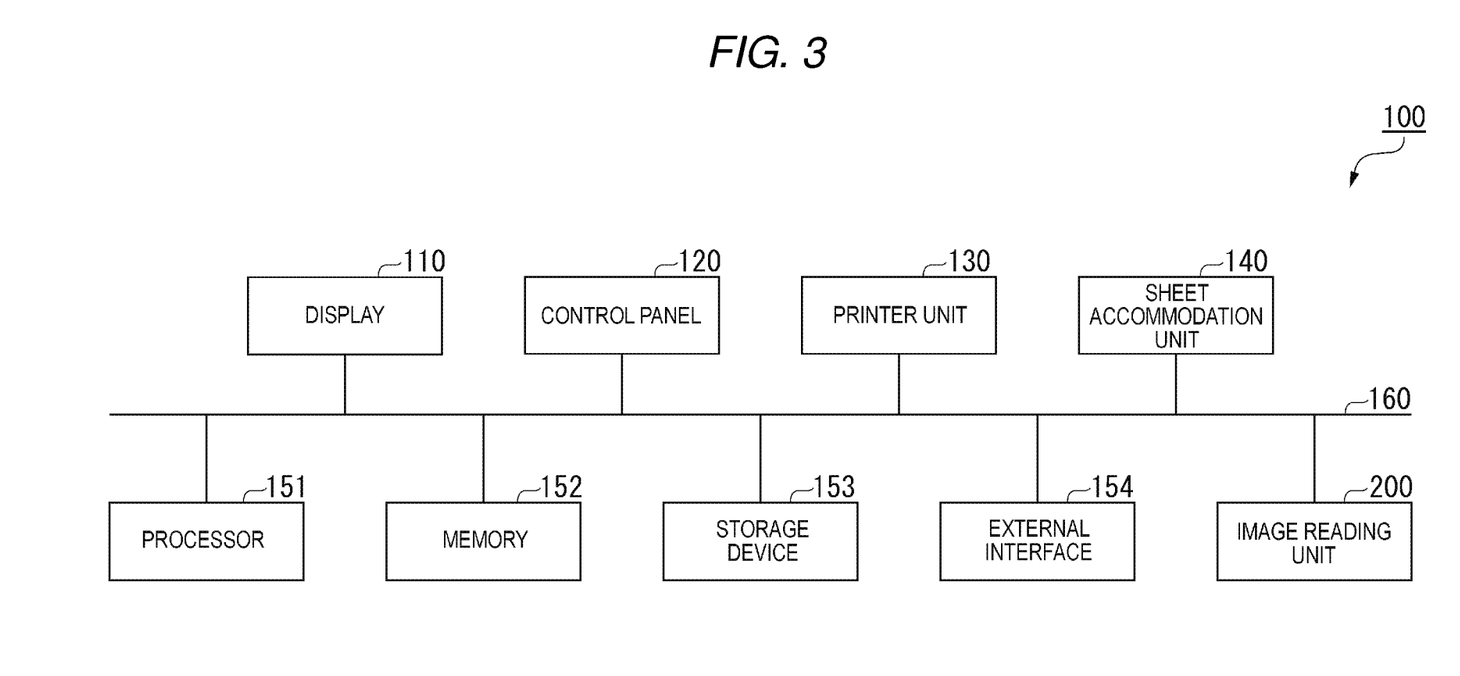
FIG. 3 is a block diagram illustrating a hardware configuration of the image forming apparatus.

FIG. 3 is a block diagram illustrating a hardware configuration of the image forming apparatus 100 according to the first embodiment. The image forming apparatus 100 includes the display 110, the control panel 120, the printer unit 130, the sheet accommodation unit 140, a processor 151, a memory 152, a storage device 153, an external interface 154, and the image reading unit 200. Since the display 110, the control panel 120, the printer unit 130, the sheet accommodation unit 140, and the image reading unit 200 are described above, repeated descriptions thereof will be omitted. The processor 151, the memory 152, the storage device 153, and the external interface 154 will be described. The respective functional units are connected to each other through a system bus 160 capable of data communication.

The processor 151 controls the operation of each of the functional units of the image forming apparatus 100. The processor 151 loads a software program stored in the storage device 153 to the memory 152 and executes the software program to execute the process. Here, an example of a specific processing of the processor 151 according a software program will be described. The processor 151 can control the image forming apparatus 100 to transition to any one of a plurality of operation modes including a power saving mode and a normal mode. In the normal mode, a predetermined electric power is supplied to equipment included in the respective image forming apparatus 100. In the power saving mode, power consumption is lower than that in the normal mode. When one or more unexecuted print jobs among print jobs capable of being acquired through the network 500 satisfy predetermined conditions indicating that a print job can be executed by the image forming apparatus 100, the processor 151 controls the image forming apparatus 100 to transition to the power saving mode only after a preset period of standby time is elapsed after completion of a job to be executed by the image forming apparatus 100. The standby time refers to a period of time image forming apparatus 100 waits before transition to the power saving mode. When none of the unexecuted print jobs satisfy the conditions indicating that a print job can be executed by the image forming apparatus 100, the processor 151 controls the image forming apparatus 100 to transition to the power saving mode after a shorter period of time than the preset standby time that would have to elapse after the completion of a designated print job. Specifically, when a user logs out, the processor 151 acquires, from the print server 400, the user's identification information that was included in the print job(s) recorded in the print server 400. When the acquired identification information identifies a user who has a previous record of using the particular image forming apparatus 100 (i.e., the image forming apparatus including the presently executing processor 151), the processor 151 controls the image forming apparatus 100 to transition to the power saving mode after a predetermined period of standby time (for example, 15 minutes) is elapsed after the completion of the print job. When the acquired identification information does not include identification information of a user with a previous record of using the particular image forming apparatus 100, the processor 151 controls the image forming apparatus 100 to transition to the power saving mode after a shorter period of time (for example, 0 to 5 minutes), which is less than the standby time would be elapsed otherwise.

The memory 152 temporarily stores data used by each of the functional units included in the image forming apparatus 100. The memory 152 is, for example, a random access memory (RAM). The memory 152 may store digital data generated by the image reading unit 200. The memory 152 may temporarily store identification information received through the control panel 120, a print job, and/or an elapsed time required to transition to the power saving mode.

The storage device 153 is, for example, a hard disk or a solid state drive (SSD) and stores various data. Various data is, for example, a history information table. The history information table is a table in which identification information of users who have a record of executing printing on the image forming apparatus 100 is recorded.

Figure 6:
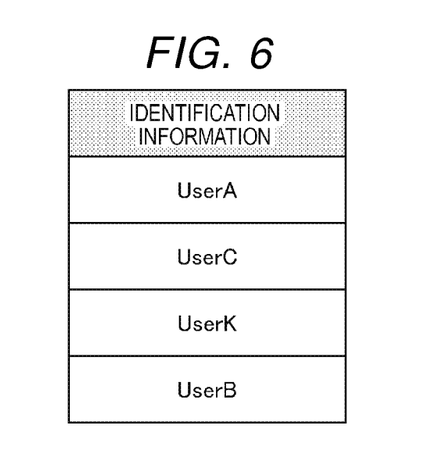
FIG. 6 is a diagram illustrating a specific example of a history information table.

FIG. 6 is a diagram illustrating a specific example of a history information table according to the first embodiment. The history information table includes history information records. The history information record has an entry for identification information. The identification information represents a user who has a record of executing printing on image forming apparatus 100. The identification information stored in the history information record is one aspect of the second identification information.

In the example illustrated in FIG. 6, the uppermost history information record in the history information table has an identification information value of "UserA". Accordingly, it can be understood from the uppermost record in the history information table that the user represented by the identification information "UserA" is a user who has a record of executing printing on the image forming apparatus 100. The history information table illustrated in FIG. 6 is merely one specific example. Therefore, the history information table may be configured in an aspect different from that of FIG. 6. For example, the history information table may include a column indicating a time and date at which the history information record is to be deleted.

Returning to FIG. 3, the description will be continued. The external interface 154 transmits and receives data to and from another apparatus. Here, another apparatus refers to an apparatus such as another image forming apparatus 100, the information processing apparatus 300, or the print server 400. The external interface 154 operates as an input interface and receives data or an instruction transmitted from another apparatus. Examples of the instruction transmitted from another apparatus include a print execution instruction and an image information storage instruction. In addition, the external interface 154 operates as an output interface and transmits data to another apparatus.

Figure 4:
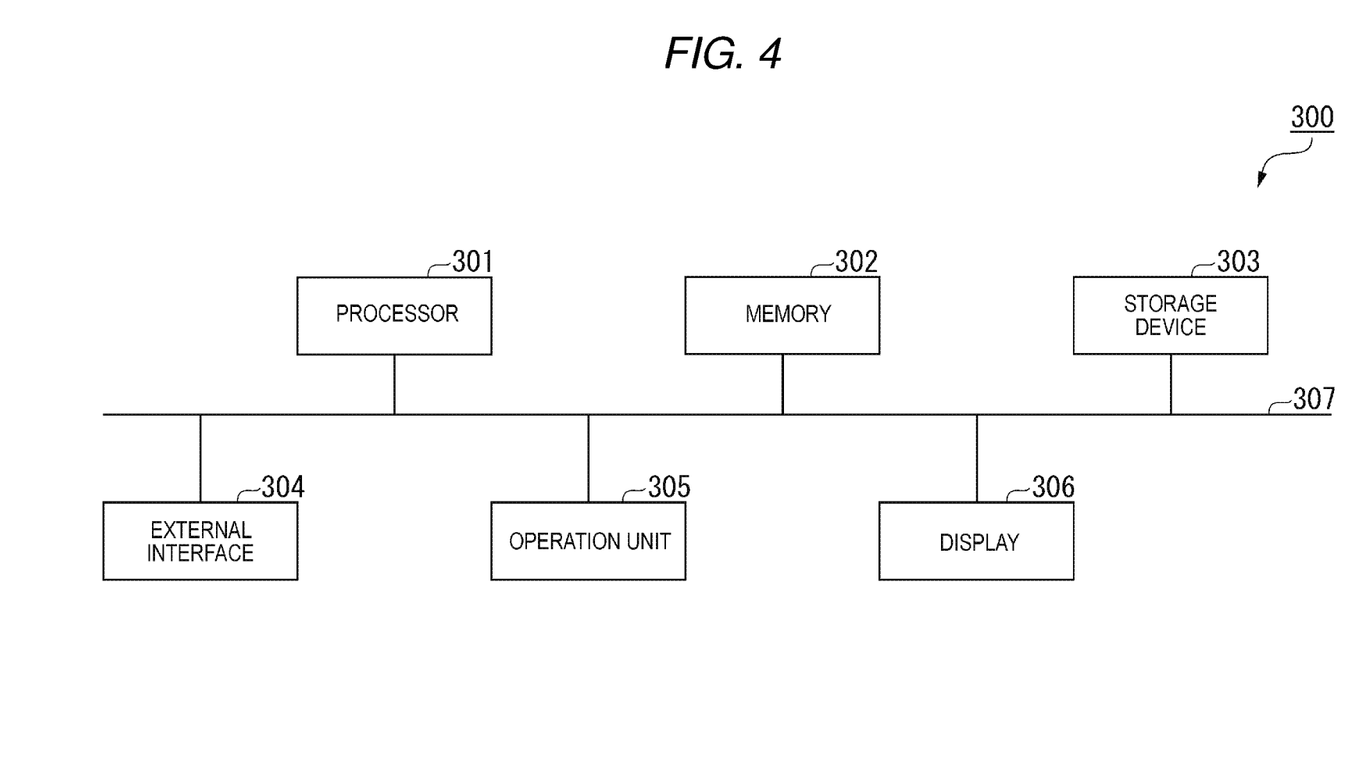
FIG. 4 is a block diagram illustrating a hardware configuration of an information processing apparatus.

FIG. 4 is a block diagram illustrating a hardware configuration of the information processing apparatus 300 according to the first embodiment. The information processing apparatus 300 includes a processor 301, a memory 302, a storage device 303, an external interface 304, an operation unit 305, and a display 306. The respective functional units are connected to each other through the system bus 160 to be capable of data communication.

The processor 301 controls the operation of each of the functional units of the information processing apparatus 300. The processor 301 loads a software program stored in the storage device 303 to the memory 302 and executes the software program to execute the process. Here, an example of a specific process of the processor 301 will be described. The processor 301 receives a print job from a user through the operation unit 305. The processor 301 transmits the received print job to the print server 400.

The memory 302 temporarily stores data used in each of the functional units included in the information processing apparatus 300. The memory 302 is, for example, a RAM. The memory 302 may store digital data representing an image as a print target.

The storage device 303 is, for example, a hard disk or an SSD and stores various data. The various data is, for example, a software program or a printer driver of a image forming apparatus 100.

The external interface 304 transmits and receives data to and from another apparatus. Here, another apparatus refers to an apparatus such as an image forming apparatus 100 or the print server 400. The external interface 304 operates as an input interface and receives data or an instruction transmitted from another apparatus. Examples of the instruction transmitted from another apparatus include a print completion instruction. In addition, the external interface 304 operates as an output interface and transmits data to another apparatus.

The operation unit 305 is an input device such as a touch panel, a mouse, or a keyboard. In some contexts, the operation unit 305 may be an interface for connecting an input device to the information processing apparatus 300 rather than the input device itself. In this case, the operation unit 305 generates input data (for example, instruction information representing an instruction for the information processing apparatus 300) from an input signal received from the input device and sends the generated input data to the information processing apparatus 300.

The display 306 is an output device such as a cathode ray tube (CRT) display, a liquid crystal display, or an organic EL (Electro Luminescence) display. The display 306 may be an interface for connecting the output device to the information processing apparatus 300. In this case, the display 306 generates a video signal from video data and outputs the video signal to a video output device connected to the display 306.

Figure 5:
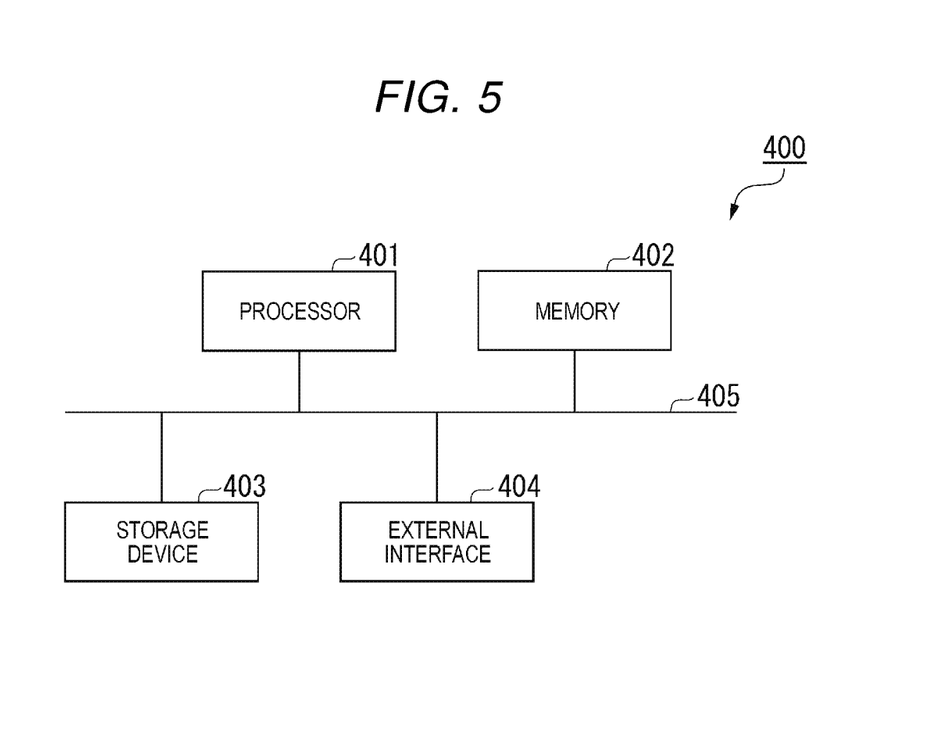
FIG. 5 is a block diagram illustrating a hardware configuration of a print server.

FIG. 5 is a block diagram illustrating a hardware configuration of the print server 400 according to the first embodiment. The print server 400 includes a processor 401, a memory 402, a storage device 403, and an external interface 404. The respective functional units are connected to each other through a system bus 405 to be capable of data communication.

The processor 401 controls the operation of each of the functional units of the print server 400. The processor 401 loads a software program stored in the storage device 403 to the memory 402 and executes the software program to execute the process. Here, an example of a specific process of the processor 401 will be described. The processor 401 receives a print job from the information processing apparatus 300. The processor 401 records the received print job in the storage device 403.

The memory 402 temporarily stores data used in each of the functional units included in the print server 400. The memory 402 is, for example, a RAM. The memory 402 may temporarily store a packet as a transmission target.

The storage device 403 is, for example, a hard disk or an SSD and stores various data. The various data is, for example, a print job or a print job table. The print job table is a table in which identification information included in print jobs that are not yet executed is recorded. The identification information included in the print job table is one aspect of the first identification information. The first identification information represents a user who transmits a print job. The print job table will be described with reference to FIGS. 7 and 8.

Figure 7:
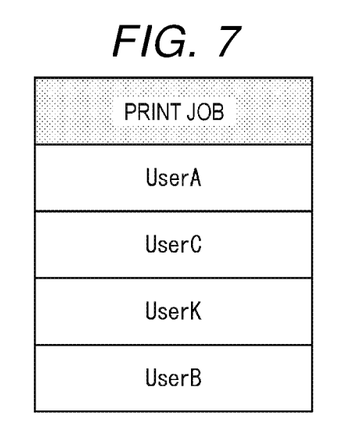
FIG. 7 is a diagram illustrating a specific example of a print job table at a first time.

FIG. 7 is a diagram illustrating a specific example of a print job table according to the first embodiment at a first time. The print job table includes print job records. The print job record has an entry for each print job. The print job includes identification information representing a user who transmits the print job.

In the example illustrated in FIG. 7, the uppermost print job record in the print job table has a print job value of "UserA". Accordingly, it can be understood from the uppermost record in the print job table that the user represented by "UserA" transmitted the print job. In addition, it can be understood that the print job has not yet printed at the first time.

Figure 8:
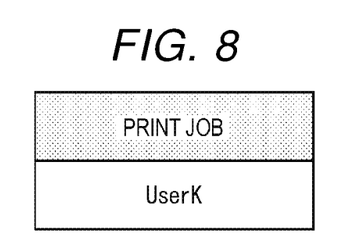
FIG. 8 is a diagram illustrating a specific example of the print job table at a second time.

FIG. 8 is a diagram illustrating a specific example of a print job table according to the first embodiment at a second time. In the example illustrated in FIG. 8, the uppermost print job record in the print job table has a print job value of "UserK". Accordingly, it can be understood from the uppermost record in the print job table that the user represented by "UserK" transmitted the print job. In addition, it can be understood that this print job is not yet printed at the second time.

The print job table illustrated in FIGS. 7 and 8 are merely examples. Therefore, the print job table may be configured in an aspect different from that of FIGS. 7 and 8. For example, the print job table may include a column indicating print setting information.

Returning to FIG. 5, the description will be continued. The external interface 404 transmits and receives data to and from another apparatus. Here, another apparatus refers to an apparatus such as an image forming apparatus 100 or the information processing apparatus 300. The external interface 404 operates as an input interface and receives data or an instruction transmitted from another apparatus. Examples of the instruction transmitted from another apparatus or the data transmitted from the other apparatus include a print job. In addition, the external interface 404 operates as an output interface and transmits data to another apparatus.

Figure 9:
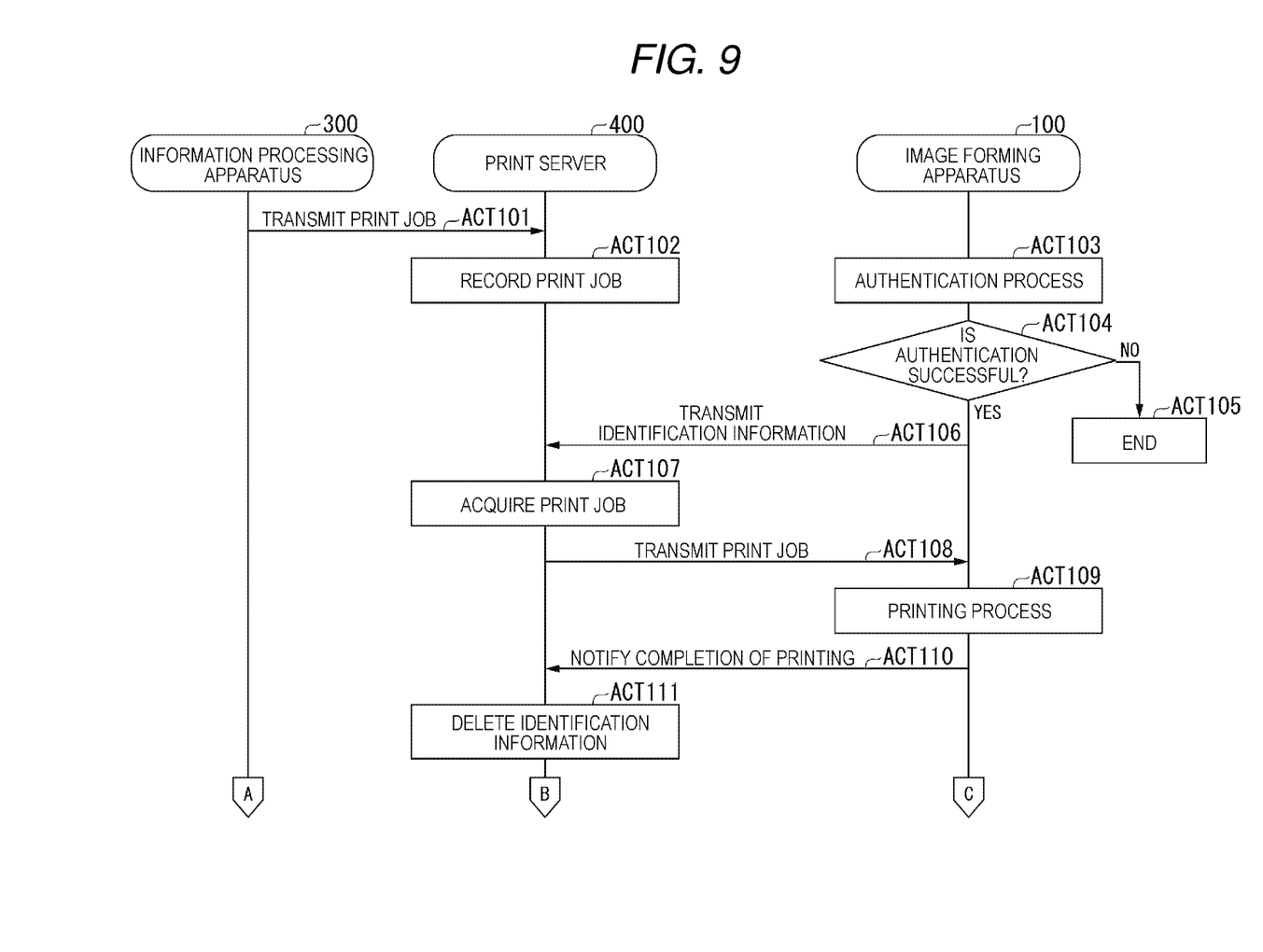
FIG. 9 is a sequence diagram illustrating a process flow of a transition to a power saving mode of the image forming system.
Figure 10:
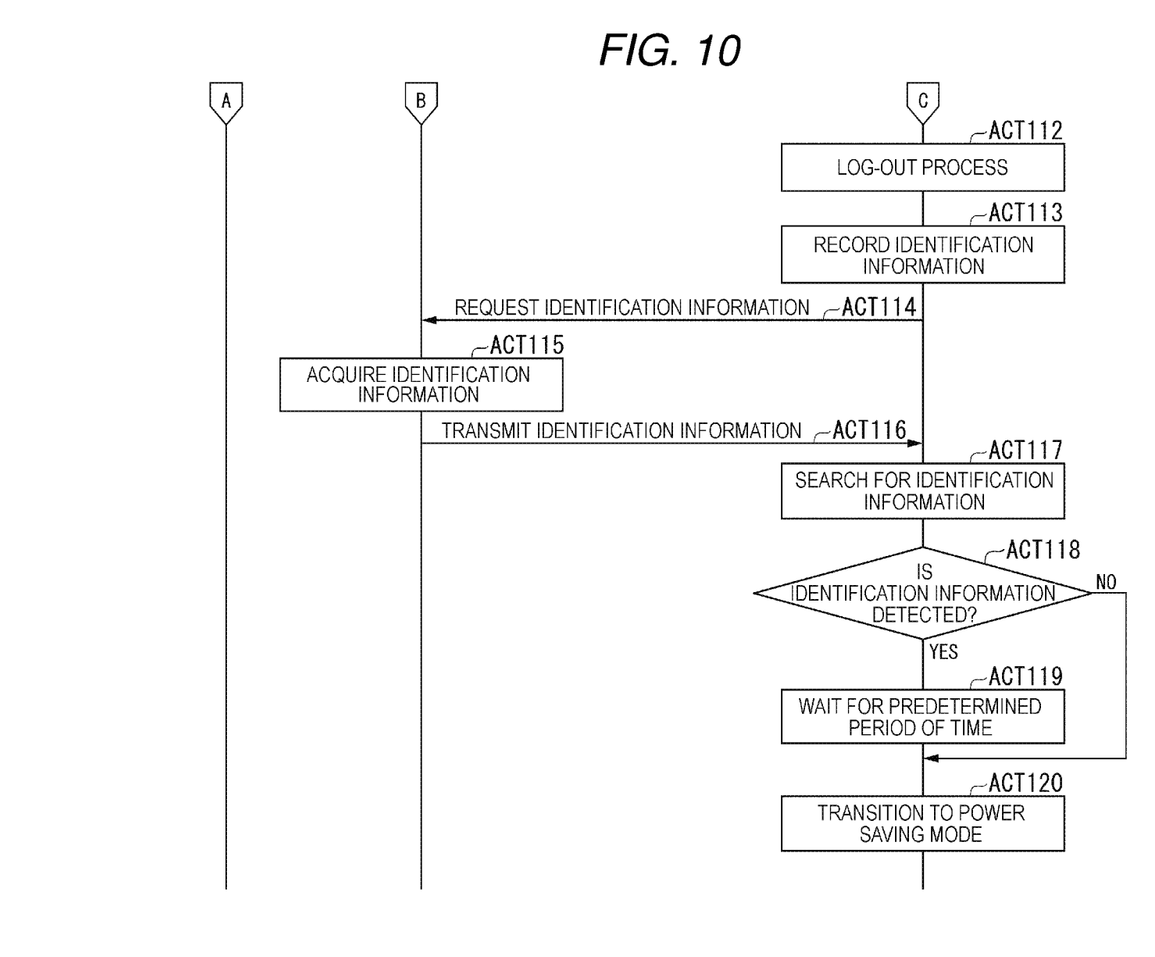
FIG. 10 is a sequence diagram illustrating the process flow of the transition to the power saving mode of the image forming system.

FIGS. 9 and 10 are sequence diagrams illustrating a process flow of a transition to the power saving mode of the image forming system 1 according to the first embodiment. The processor 301 transmits a print job to the print server 400 (ACT 101). Specifically, the processor 301 receives a print instruction from a user through the operation unit 305. The processor 301 generates a print job based on the print instruction. The print job includes information relating to an image for printing and identification information of the user. The processor 401 of the print server 400 records the received print job in the storage device (ACT 102). Specifically, the processor 401 records the print job in the storage device 403. The processor 401 records the identification information included in the print job in the print job table.

The processor 151 of the image forming apparatus 100 executes an authentication process of the user (ACT 103). Specifically, the processor 151 of the image forming apparatus 100 receives identification information input through the control panel 120. The processor 151 determines whether or not the identification information is authentic. The processor 151 may determine whether or not the identification information is authentic by determining whether or not the received identification information is included in a list of identification information for the authentication process which is recorded in advance. The identification information for the authentication process may be recorded in the storage device 153 of the image forming apparatus 100 or may be recorded in the storage device 403 of the print server 400.

The processor 151 determines whether or not the authentication process is successful (ACT 104). When the authentication process is not successful (ACT 104: NO), the processor 151 ends the process (ACT 105). Specifically, when the received identification information is not included in the list of identification information for the authentication process, the processor 151 determines that the authentication process is not successful. When the authentication process is successful (ACT 104: YES), the processor 151 transmits the received identification information to the print server 400 (ACT 106). Specifically, when the received identification information is included in the list of identification information for the authentication process, the processor 151 determines that the authentication process is successful.

The processor 401 of the print server 400 acquires a print job (ACT 107). Specifically, the processor 401 acquires a print job including the received identification information from the storage device 403. The processor 401 transmits the acquired print job to the image forming apparatus 100 (ACT 108).

The processor 151 of the image forming apparatus 100 executes a printing process based on the print job (ACT 109). Specifically, the processor 151 controls the printer unit 130 to form an image included in the print job on the sheet. The processor 151 causes the sheet on which the image is formed to be discharged to a paper discharge tray of the image forming apparatus 100. The processor 151 transmits a print completion notification to the print server 400 (ACT 110). The print completion notification refers to a notification indicating that the print job transmitted from the print server 400 is executed. The print completion notification includes identification information included in the print job.

The processor 401 deletes the identification information from the print job table (ACT 111). Specifically, when the print completion notification is received, the processor 401 acquires the print job table from the storage device 403. The processor 401 deletes the identification information included in the print completion notification from the print job table. The processor 401 deletes the print job that includes the identification information included in the print completion notification from the storage device 403. The processor 401 records the print job table from which the identification information is deleted in the storage device 403.

The processor 151 executes a log-out process (ACT 112). Specifically, when a predetermined period of time is elapsed without receiving any input operation after receiving the print completion notification, the processor 151 executes the log-out process. The log-out process is a process of cancel-ing the previous authentication of the user. The processor 151 may also explicitly receive an instruction for the log-out process from the user through the control panel 120.

The processor 151 records the identification information in the history information table (ACT 113). Specifically, the processor 151 acquires the history information table from the storage device 153. The processor 151 records the identification information received through the control panel 120 during the authentication process, in the history information table. The processor 151 records the history information table in the storage device 153.

The processor 151 requests the print server 400 for identification information (ACT 114). Specifically, the processor 151 requests the print server 400 for identification information included in print jobs that are not yet executed. The processor 401 then acquires the identification information (ACT 115). Specifically, the processor 401 acquires the print job table recorded in the storage device 403. The processor 401 acquires all the identification information included in the print job table. The processor 401 transmits the acquired identification information to the image forming apparatus 100 (ACT 116).

The processor 151 searches for whether or not the received identification information includes the identification information which is included in the history information table (ACT 117). Specifically, the processor 151 acquires the history information table recorded in the storage device 403. The processor 151 acquires identification information from the history information table. The processor 151 searches for whether or not the acquired identification information as a search target is included in the identification information received from the print server 400.

When the identification information received from the print server 400 includes the identification information as a search target (ACT 118: YES), the processor 151 waits for a predetermined period of time before transitioning to the power saving mode (ACT 119). Specifically, the processor 151 controls the image forming apparatus 100 to wait for a predetermined period of time in a state where the supply of electric power is continued. When the identification information received from the print server 400 does not include the identification information as a search target (ACT 118: NO), the processor 151 transitions the image forming apparatus 100 to the power saving mode (ACT 120). The processor 151 may proceed to ACT 120 immediately (standby time: zero) or may proceed to ACT 120 after waiting for a shorter period of time than the predetermined period of time in ACT 119.

In the image forming apparatus 100 having the above-described configuration, the processor 151 executes the log-out process after executing the printing process. After executing the log-out process, the processor 151 acquires the identification information recorded in the print job table from the print server 400. The processor 151 searches for whether or not the acquired identification information includes the identification information recorded in the history information table. When the identification information received from the print server 400 includes the relevant (the just logged out user's) identification information, the processor 151 controls the image forming apparatus 100 to wait in the normal mode for a predetermined period of time and then to transition to the power saving mode. When the identification information received from the print server 400 does not include the relevant identification information, the processor 151 controls the image forming apparatus 100 to transition to the power saving mode immediately. The processor 151 adjusts the timing at which the image forming apparatus 100 transitions the image forming apparatus 100 to the power saving mode and, therefore, the power saving and usability of the image forming apparatus 100 can be optimized.

The processor 151 of the image forming apparatus 100 may be configured such that identification information is acquired directly from a communication apparatus belonging to a user. The communication apparatus may be an information processing apparatus such as a smartphone, a tablet computer, or a wearable computer. The communication apparatus transmits the identification information corresponding to the user using the image forming apparatus 100 through a near field communication using a beacon or the like. The identification information transmitted from the communication apparatus is one aspect of the second identification information. The second identification information corresponds to a user who has the possibility of using the image forming apparatus 100. The processor 151 may be configured to determine the timing at which the image forming apparatus 100 will transition to the power saving mode using the acquired identification information to vary the timing accordingly. The processor 151 stores the identification information acquired from the communication apparatus only for a predetermined period of time. After executing a log-out process, the processor 151 acquires the identification information recorded in the print job table from the print server 400. The processor 151 searches for whether or not the identification information acquired from the print server 400 includes the identification information acquired from the communication apparatus. The processor 151 adjusts the timing to transition to the power saving mode according to the search result. With the above-described configuration, when a user of a print job is present in the vicinity of the image forming apparatus 100, the processor 151 controls the image forming apparatus 100 not to transition to the power saving mode immediately. When the user is not present in the vicinity of the image forming apparatus 100, the processor 151 controls the image forming apparatus 100 to transition to the power saving mode immediately. As a result, the power saving and the usability can be optimized. After a predetermined period of time is elapsed, the processor 151 disposes of the acquired identification information.

The storage device 153 of the image forming apparatus 100 may be configured to record a plurality of predetermined identification information. The predetermined identification information may be determined by an administrator or the like of the image forming apparatus 100. The predetermined identification information is one aspect of the second identification information. The processor 151 may be configured to determine the timing at which the image forming apparatus 100 transitions to the power saving mode using this predetermined identification information to adjust accordingly. Specifically, after executing the log-out process, the processor 151 acquires the identification information recorded in the print job table from the print server 400. After executing the log-out process, the processor 151 acquires the plurality of predetermined identification information from the storage device 153. The processor 151 searches for whether or not the plurality of predetermined identification information includes the identification information acquired from the print server 400. The processor 151 adjusts the timing to transition to the power saving mode according to the search result, thereby optimizing the power saving and the usability of the image forming apparatus 100. In addition, the administrator or the like determines the predetermined identification information and thus, a user who does not want to wait for printing can print without waiting for a period of time required for waking up from the power saving mode.

The history information table of the image forming apparatus 100 may include a column indicating the frequency of printing executed by a user represented by the identification information. The frequency may be the number of times that a print job is executed by a user represented by identification information within some predetermined period of time. The processor 151 may be configured to adjust the time to transition to the power saving mode based on the print job table and the frequency. Specifically, after executing the log-out process, the processor 151 acquires the identification information recorded in the print job table from the print server 400. After executing the log-out process, the processor 151 acquires identification information of a history information record having a higher frequency than a predetermined threshold from the history information table. The identification information of the history information record having a higher frequency than the predetermined threshold is one aspect of the second identification information. The processor 151 searches for whether or not the acquired identification information includes the identification information acquired from the history information table. The processor 151 adjusts the timing to transition to the power saving mode according to the search result, thereby optimizing the power saving and the usability of the image forming apparatus 100.

When the print job table includes a column for print setting information, the processor 151 may be configured to adjust the timing to transition to the power saving mode based on the print setting information and the functions included in the image forming apparatus 100. Specifically, after executing the log-out process, the processor 151 acquires the print setting information recorded in the print job table from the print server 400. Examples of the print setting information include color or monochrome and simplex printing or duplex printing. The processor 151 determines whether or not the acquired print setting information can be printed using the functions included in the image forming apparatus 100. When the acquired print setting information can be printed using the functions included in the image forming apparatus 100, the processor 151 waits for a predetermined period of time and then to transition to the power saving mode. When the acquired print setting information cannot be printed using the particular functions included in the image forming apparatus 100, the processor 151 transitions the image forming apparatus 100 to the power saving mode immediately. The processor 151 adjusts the timing to transition to the power saving mode, thereby optimizing the power saving and the usability of the image forming apparatus 100.

Second Embodiment

Next, the image forming system 1 according to a second embodiment will be described. The image forming system 1 according to the second embodiment is different from that according to the first embodiment in that a print server 400 is not provided; however, the other aspects are the same. Hereinafter, differences from the first embodiment will be described.

In the image forming system 1 according to the second embodiment, the image forming apparatus 100 receives a print job. The storage device 153 of the image forming apparatus 100 stores the received print job. The storage device 153 stores various data such as a print job and/or a print job table. The print job or the print job table stored in the storage device 153 is the same as the data stored in the storage device 403 of the print server 400.

Figure 11:
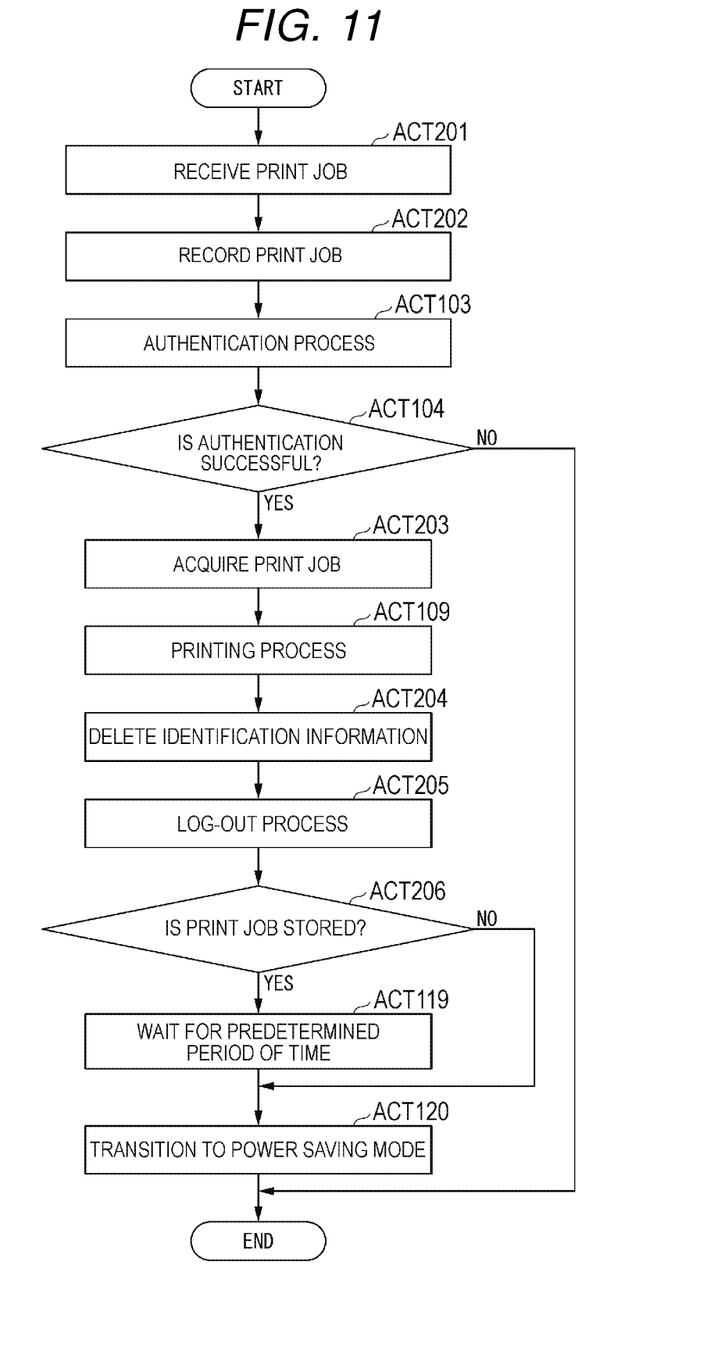
FIG. 11 is a flowchart illustrating a process flow of a transition of an image forming system according to a second embodiment to the power saving mode.

FIG. 11 is a flowchart illustrating a process flow of a transition to the power saving mode of the image forming system 1 according to the second embodiment. The flowchart is executed when a print job is received from the information processing apparatus 300. Since ACTs 103, 104, 109, 119, and 120 in FIG. 11 are the same as those of the first embodiment, repeated descriptions thereof will be omitted. The processor 151 of the image forming apparatus 100 receives the print job transmitted from the information processing apparatus 300 (ACT 201). The print job includes information relating to an image for printing and identification information of a user. The processor 151 records the print job in the storage device 153 (ACT 202). Specifically, the processor 151 records the print job in the storage device 153. The processor 153 records the identification information included in the print job in the print job table. When the authentication process is successful in ACT 104 (ACT 104: YES), the processor 151 acquires the print job (ACT 203). Specifically, the processor 151 acquires the print job including the identification information, which is received from the storage device 153 by the authentication process.

The processor 151 deletes the identification information from the print job table (ACT 204). Specifically, when the printing process is completed, the processor 151 acquires the print job table from the storage device 153. The processor 151 deletes the identification information included in the print job from the print job table. The processor 151 deletes the print job for which the printing process is executed from the storage device 153. The processor 151 records the print job table from which the identification information is deleted in the storage device 153.

The processor 151 executes a log-out process (ACT 205). Specifically, when a predetermined period of time is elapsed without receiving any operations after completion of the printing process, the processor 151 executes the log-out process. The processor 151 may explicitly receive an instruction of the log-out process from the user through the control panel 120.

The processor 151 determines whether or not the print job is stored in the storage device 153 (ACT 206). When the print job is stored in the storage device 153 (ACT 206: YES), the processor 151 proceeds to ACT 119. When the print job is not stored in the storage device 153 (ACT 206: NO), the processor 151 transitions the image forming apparatus 100 to the power saving mode (ACT 120). The processor 151 may proceed to ACT 120 immediately (standby time: zero) or may proceed to ACT 120 after waiting for a shorter period of time than the predetermined period of time in ACT 119.

In the second embodiment, the processor 151 changes the period of time to transition to the power saving mode depending on whether or not a print job is stored in the storage device 153 when a user logs out. The processor 151 may instead be configured to change the period of time to transition to the power saving mode depending on whether or not a print job is stored in the storage device 153 when the printing process is completed.

In the image forming apparatus 100, even when the system configuration does not include a print server 400, the processor 151 can still adjust the time to transition to the power saving mode, and the power saving and the usability of the image forming apparatus 100 can be optimized.

In the first embodiment, the image forming system 1 is described as including a print server 400. However, the image forming system 1 may be configured not to include a separate print server 400. In this case, any one of a plurality of image forming apparatuses 100 may include the function of a print server 400, or a plurality of image forming apparatuses 100 may be configured to share the function of the print server 400.

In an embodiment, the processor 151 is configured to determine the time to transition to the power saving mode from when the log-out process is executed, but this determination may not necessarily be after the log-out process occurs. In some embodiments, processor 151 may determine the time to transition to the power saving mode after any predetermined process is executed, for example, after a printing process is executed, after an image reading process is executed, or after a FAX is received.

In the above-described embodiments, the time to transition to the power saving mode is determined by the processor 151, but in other embodiments the time is not necessarily determined by the processor 151 itself. For example, the processor 401 of the print server 400 may be configured to set the time to transition to the power saving mode and to transmit the setting to the processor 151. In this case, the processor 151 controls the image forming apparatus 100 to transition to the power saving mode based on the setting received from the print server 400.

The print server 400 may be implemented using a plurality of information processing apparatuses that are communicably connected to each other through the network 500. In this case, the print server 400 may be implemented in a state where the respective functional units included in the print server 400 are distributed to the plurality of information processing apparatuses. For example, the storage device 403 and the processor 401 may be mounted on different information processing apparatuses, respectively.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus having a plurality of operation modes including a normal mode and a power saving mode in which power consumption is less than that in the normal mode, the apparatus comprising:
    a processor configured to:
        acquire information of unexecuted print jobs via a communication interface,
        transition to the apparatus to the power saving mode after a preset standby time elapses after a completion of a print job by the apparatus if an unexecuted print job in the unexecuted print jobs satisfies predetermined conditions that indicate that the unexecuted print job can be executed on the apparatus, and
        transition the apparatus to the power saving mode after a standby time shorter than the preset standby time is elapsed after the completion of the print job if none of the unexecuted print jobs satisfies the predetermined conditions, wherein
    each print job includes first identification information indicating a user who requested the print job, and
    the processor is further configured to:

control the apparatus to transition to the power saving mode at the preset standby time after the completion of an executed print job if the first identification information in the executed print job corresponds to a predetermined user having stored second identification information in the apparatus, and control the apparatus to transition to the power saving mode after a standby time shorter than the preset standby time after the completion of the executed print job if the first identification information in the executed print job does not correspond to the predetermined user having stored second identification information in the apparatus.

2. The apparatus according to claim 1, wherein the second identification information identifies users who have previously had a print job executed on the apparatus.

3. The apparatus according to claim 1, further comprising: a near field communication interface, wherein the second information is acquired from a user communication apparatus via the near field communication interface.

4. The apparatus according to claim 1, further comprising: a storage device, wherein the second identification information is stored in the storage device.

5. The apparatus according to claim 1, wherein the second identification information includes information indicating a frequency of prior use of the apparatus by a user.

6. The apparatus according to claim 1, wherein the print job includes printer setting information representing settings for executing a printing on a sheet and the predetermined conditions include compatibility of the printer setting information with the apparatus.

7. The apparatus according to claim 1, wherein the processor is configured to determine whether unexecuted print jobs satisfy the predetermined conditions.

8. The apparatus according to claim 1, wherein the processor is configured to acquire an indication of whether unexecuted print jobs satisfy the predetermined conditions from an external device.

9. The apparatus according to claim 8, wherein the external device is a print server.

10. A printer system, comprising:
a print server configured to receive print job requests;
an image forming apparatus connected to the print server and having a plurality of operation modes including a normal mode and a power saving mode in which power consumption is less than that in the normal mode, the image forming apparatus comprising:
a processor configured to:
acquire information of unexecuted print job requests from the print server via a communication interface,
transition to the image forming apparatus to the power saving mode after a preset standby time elapses after a completion of a print job by the image forming apparatus if an unexecuted print job in the unexecuted print job requests satisfies predetermined conditions that indicate that the unexecuted print job can be executed on the image forming apparatus, and
transition the image forming apparatus to the power saving mode after a standby time shorter than the preset standby time is elapsed after the completion of the print job if none of the unexecuted print job requests satisfy the predetermined conditions, wherein
each print job request includes first identification information indicating a user who made the print job request, and the processor is further configured to:
control the apparatus to transition to the power saving mode at the preset standby time after the completion of an executed print job if the first identification information in the executed print job corresponds to a predetermined user having stored second identification information in the image forming apparatus, and control the apparatus to transition to the power saving mode after a standby time shorter than the preset standby time after the completion of the executed print job if the first identification information in the executed print job does not correspond to the predetermined user having stored second identification information in the image forming apparatus.

11. The printer system according to claim 10, wherein the second identification information identifies users who have previously had a print job executed on the apparatus.

12. The printer system according to claim 10, further comprising:
a near field communication interface, wherein the second information is acquired from a user communication apparatus via the near field communication interface.

13. The printer system according to claim 10, wherein the print job request includes printer setting information representing settings for executing a printing on a sheet and the predetermined conditions include compatibility of the printer setting information with the image forming apparatus.

14. The printer system according to claim 10, wherein the processor is configured to determine whether unexecuted print job requests satisfy the predetermined conditions.

15. The printer system according to claim 10, wherein the processor is configured to acquire an indication of whether unexecuted print job requests satisfy the predetermined conditions from the print server.

16. An image forming method for an image forming apparatus having a plurality of operation modes including a normal mode and a power saving mode in which power consumption is less than that in the normal mode, the method comprising:
acquiring information of unexecuted print jobs via a communication interface, wherein each print job includes first identification information indicating a user who requested the print job;
transitioning to the apparatus to the power saving mode after a preset standby time elapses after a completion of a print job by the apparatus if an unexecuted print job in the unexecuted print jobs satisfies predetermined conditions that indicate that the unexecuted print job can be executed on the apparatus;
transitioning the apparatus to the power saving mode after a standby time shorter than the preset standby time is elapsed after the completion of the print job if none of the unexecuted print jobs satisfies the predetermined conditions,
transitioning the image forming apparatus to the power saving mode at the preset standby time after the completion of an executed print job if the first identification information in the executed print job corresponds to a predetermined user having stored second identification information in the image forming apparatus; and
transitioning to the power saving mode after a standby time shorter than the preset standby time after the completion of the executed print job if the first identification information in the executed print job does not correspond to the predetermined user having stored second identification information in the apparatus.

17. The image forming method according to claim 16, wherein the information of unexecuted print jobs is acquired from a print server.

\* \* \* \* \*